United States Patent
Bennett, III et al.

(10) Patent No.: US 6,876,739 B2
(45) Date of Patent: *Apr. 5, 2005

(54) METHOD AND APPARATUS FOR DEMONSTRATING TELECOMMUNICATIONS PRODUCTS

(75) Inventors: Raymond Walden Bennett, III, Naperville, IL (US); Robert Wesley Bossemeyer, Jr., St. Charles, IL (US); Michael Steven Pickard, Highland Park, IL (US); Jordan Howard Light, Chicago, IL (US); Barry James Sullivan, Long Grove, IL (US); Edmond W. Israelski, Lake Barrington, IL (US); Denise Violetta Kagan, Riverwoods, IL (US); Richard Peter Krupka, Barrington, IL (US); Jose M. Cruz, Naperville, IL (US); Philip Martin Stebbings, Aurora, IL (US); Bruce Edward Stuckman, Algonquin, IL (US)

(73) Assignee: SBC Properties, L.P., Reno, NV (US)

( * ) Notice: Subject to any disclaimer, the term of this patent is extended or adjusted under 35 U.S.C. 154(b) by 22 days.

This patent is subject to a terminal disclaimer.

(21) Appl. No.: 10/386,885

(22) Filed: Mar. 12, 2003

(65) Prior Publication Data

US 2003/0156705 A1 Aug. 21, 2003

Related U.S. Application Data

(63) Continuation of application No. 09/384,704, filed on Aug. 27, 1999.

(51) Int. Cl.⁷ .................................................. H04M 3/00
(52) U.S. Cl. ............................. 379/265.01; 379/265.09
(58) Field of Search ...................... 379/265.01–265.14, 379/266.01–266.1, 93.01, 309

(56) References Cited

U.S. PATENT DOCUMENTS

| 6,151,643 | A | * | 11/2000 | Cheng et al. | 710/36 |
| 6,314,408 | B1 | * | 11/2001 | Salas et al. | 705/54 |
| 6,349,290 | B1 | * | 2/2002 | Horowitz et al. | 705/35 |
| 6,393,103 | B1 | * | 5/2002 | Clark et al. | 379/29.02 |
| 6,603,853 | B1 | * | 8/2003 | Bennett, III et al. | 379/265.01 |

* cited by examiner

Primary Examiner—William J. Deane, Jr.

(57) ABSTRACT

A telecommunication product demonstration system is comprised of three major components, including customer facility equipment, sales agent facility equipment, and telecommunication service simulation equipment. The system allows a sales agent to demonstrate various long distance services and telecommunications services to potential customers.

20 Claims, 1 Drawing Sheet

METHOD AND APPARATUS FOR DEMONSTRATING TELECOMMUNICATIONS PRODUCTS

CROSS REFERENCE TO RELATED APPLICATION

This is a Continuation of U.S. patent application Ser. No. 09/384,704 filed on Aug. 27, 1999.

TECHNICAL FIELD

The present invention relates generally to telecommunication systems and more particularly to a method and apparatus for demonstrating telecommunications products.

BACKGROUND ART

The telephone is one of the most widely used pieces of communication equipment in the world. At first, it was merely a convenient tool to allow people to communicate with each other without the necessity of being face-to-face and without the time log associated with written communication. Presently, in addition to performing communications functions, the telephone is a tool used to market products and services, provide technical support for consumer products, and, among other things, allow callers to access information such as their own financial data. Thus, the telephone is a major business, marketing and information resource.

When marketing telecommunication products and services, sales representatives discuss available services and attempt to align them with potential customer needs. Presently, the agent must use verbal descriptions to convey the benefits of the service to the potential customer. The agent can claim various benefits and attributes of the offered service such as superior sound quality or ease of use, but these sales propositions cannot be directly demonstrated. In other words, the problem is analogous to selling an automobile without allowing the potential buyer to test drive the vehicle.

The desire, therefore, is to provide an improved method and apparatus for demonstrating telecommunications products to potential customers. Preferably, the improved method provides a means for sales agents to provide potential customers with direct experience with the service.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
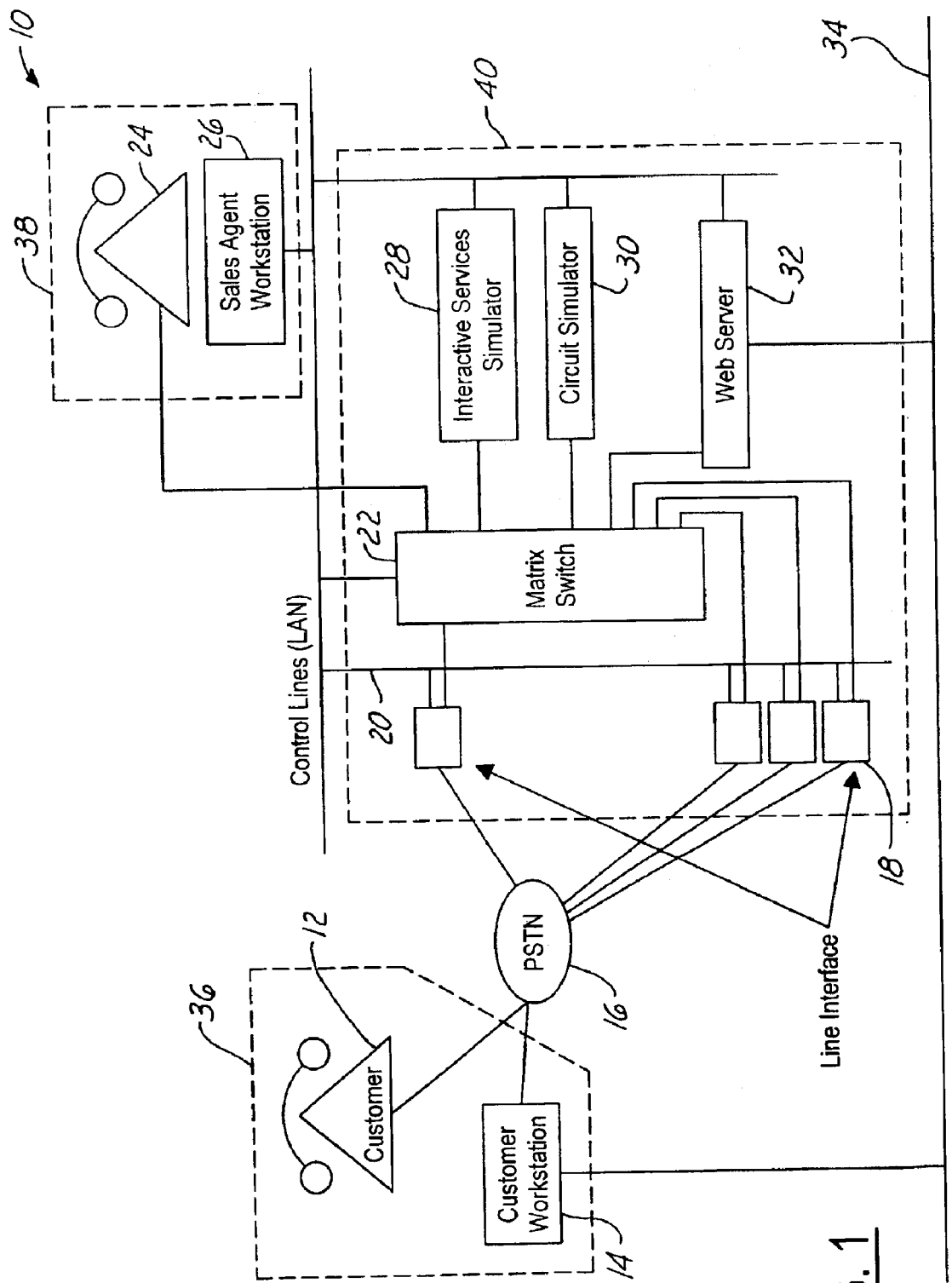
FIG. 1 is a block diagram of a telecommunication product demonstration system in accordance with one embodiment of the present invention.

Referring to FIG. 1, a block diagram of a telecommunication product demonstration system 10 in accordance with one embodiment of the present invention is illustrated. Telecommunication product demonstration system 10 comprises of three major components, including customer facility equipment 36, sales agent facility equipment 38, and telecommunication service simulation equipment 40.

Customer facility equipment 36 is located on a potential customer's premise and is coupled to public switched telecommunications network (PSTN) 16. Customer facility equipment 36 comprises of a customer telephone 12 coupled to PSTN 16 for providing telephone service to the customer and a customer workstation 14 such as a computer. In the preferred embodiment, customer workstation 14 has an Internet connection 34 and is coupled to PSTN 16.

Sales agent facility equipment 38 is located on the sales agent's premise and is coupled to telecommunication service simulation equipment 40. Sales agent facility equipment 38 comprises a sales agent telephone 24 for providing telephone service to the sales agent and a sales agent workstation 26. Sales agent workstation 26 is coupled to control line 20 and provides overall control of telecommunication service simulation equipment 40 for demonstration purposes.

Telecommunication service simulation equipment 40 is coupled to sales agent facility equipment 38 and PSTN 16. Telecommunication service simulation equipment 40 comprises a plurality of line interface modules 18, matrix switch 22, interactive services simulator 28, circuit simulator 30 and web server 32.

Line interface modules 18 are coupled to PSTN 16 and are controlled from sales agent workstation 26 or web server 32 via control lines 20. Line interface modules 18 are capable of sending signals to create a connection through PSTN 16. Line interface modules 18 could connect to an ordinary analog telephone line or they could be used with ISDN or similar digital networks.

Matrix switch 22 is coupled to line interface modules 18, sales agent telephone 24, interactive services simulator 28, circuit simulator 30 and web server 32. Matrix switch 22 is controlled from sales agent workstation 26 or web server 32 via control line 20 and allows the sales agent to speak to the potential customer through matrix switch 22 and a line interface module 18. Matrix switch 22 is a switch capable of connecting any number of lines on one side to any combination of lines on the other side. Typically, matrix switch 22 also provides automatic gain control and noise limiting in the same manner as a conference bridge.

Interactive services simulator 28 is coupled to matrix switch 22 and is controlled from sales agent workstation 26 or web server 32 via control line 20 and allows the sales agent to demonstrated various telecommunication services to a potential customer. Alternatively, system 10 could be configured to automatically demonstrate various telecommunication services to a potential customer when the potential customer calls some particular telephone number. Interactive services simulator 28 is capable of demonstrated a plurality of telecommunication services, including, voice mail, privacy manager, and talking call waiting.

Circuit simulator 30 is coupled to matrix switch 22 and is controlled from sales agent workstation 26 or web server 32 via control line 20 and allows the sales agent to demonstrate various long distance services to a potential customer. Circuit simulator 30 is capable of simulating a plurality of long distance services, including, conventional circuit switched services provided by various long distance companies, and packet switched services using varying degrees of compression provided over the Internet or other private Internet Protocol (IP) links.

Web server 32 is coupled to matrix switch 22 and Internet connection 34 allows remote control of line interface modules 18, matrix switch 22, interactive services simulator 28, and circuit simulator 30 via control line 20. Potential customers can access web server 32 via an Internet connection 34 and can interact with various services using customer workstation 14. In addition, a sales agent could be bridged onto the call at any time.

In operation, a sales agent controls matrix switch 22 and line interface modules 18 via control line 20 to establish a connection (call) between sales agent telephone 24 and customer telephone 12 via PSTN 16. The sales agent then discusses various telecommunications services such as, for example, long distance service with the potential customer. During their discussion the sales agent can control matrix switch 22 and circuit simulator 30 to demonstrate the simulated quality or features of different distance services. Alternatively, the sales agent can control matrix switch 22 and line interface modules 18 to demonstrate the quality or features actual distance services via PSTN 16.

The sales agent then discusses various other telecommunication services with the potential customer. The sales agent controls matrix switch 22 and interactive services simulator 28 to demonstrate each service. In the case of voice mail, interactive services simulator 28 allows the sales agent to invoke voice mail and to control it so that, for example, normal operation could be "paused" so the potential customer can be told about its capabilities at appropriate times. In the case of a service such as privacy manager, interactive services simulator 28 allows the sales agent to assist the potential customer to step through the service being demonstrated. In this manner, the customer has the chance to "test drive" each potential telecommunication service of interest.

In another aspect of the invention, interactive services simulator 28 may be used for automated demonstration of services. The potential customer could call telecommunication service simulation equipment 40 and/or connects to it via Internet connection 34. The interactive services simulator 28 then provides interactive voice response menus to guide the potential customer through the various services that can be demonstrated. In addition, web server 32 could provide demonstration of in-bound and out-bound services or synchronize with a telephone connection to provide feedback during service demonstration. Customer activity is tracked on sales agent workstation 26 for potential follow-up.

From the foregoing, it can be seen that there has been brought to the art a new and improved method and apparatus for demonstrating telecommunications products. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A method for demonstrating telecommunications products comprising the steps of;
   selectively controlling a plurality of telecommunications service simulation equipment; and
   in response to a customer request, demonstrating at least one telecommunications service to a potential customer while said customer is in communication with a public switched telecommunications network.

2. A method for demonstrating telecommunications products as recited in claim 1 further comprising the step of providing an Internet connection to said telecommunication service simulation equipment.

3. A method for demonstrating telecommunications products as recited in claim 1 wherein the step of selectively controlling further comprises the steps of:
   controlling a matrix switch to generate an actual circuit on a public switched telephone network; and
   demonstrating the quality of said circuit to said potential customer.

4. A method for demonstrating telecommunications products as recited in claim 1 wherein the step of selectively controlling further comprises the steps of:
   controlling a matrix switch to connect said potential customer to an interactive services simulator;
   controlling said interactive services simulator to generate a telecommunications service; and
   demonstrating said telecomnmunications service to said potential customer.

5. A method for demonstrating telecommunications products as recited in claim 1 wherein the step of selectively controlling further comprises the steps of:
   controlling a matrix switch to connect said potential customer to a circuit simulator;
   controlling said circuit simulator to generate a simulated long distance service; and
   demonstrating the quality of said simulated long distance service to said potential customer.

6. A method for demonstrating telecommunications products as recited in claim 1 wherein the demonstrated telecommunications service comprises at least one of voice mail, privacy manager, long distance calling, internet service or call waiting.

7. A method for demonstrating telecommunications products as recited in claim 1 wherein the demonstrated telecommunications service comprises a circuit-switched service or a packet-switched service.

8. A method of demonstrating telecommunications products as recited in claim 1 wherein the step of demonstrating includes selectively demonstrating at least one demonstratable service to said customer while a sales agent is in telephone communication with said customer.

9. A method of demonstrating telecommunications products as recited in claim 6 wherein said sales agent selectively controls said plurality of telecommunications service simulation equipment.

10. A method of demonstrating telecommunications products comprising the steps of:
    providing an Internet connection to said telecommunications service simulation equipment:
    controlling a plurality of telecommunications service simulation equipment;
    allowing a potential customer access to said telecommunications service simulation equipment through a web server coupled to said Internet connection; and
    in response to a customer request, demonstrating at least one telecommunications service to said potential customer while said customer is in communication with said web server.

11. A method of demonstrating telecommunications products as recited in claim 10 further comprising the step of answering a potential customer incoming call.

12. A method for demonstrating telecommunications products as recited in claim 10 further comprising the step of establishing a telephone communication link between said potential customer and a sales agent.

13. A method of demonstrating telecommunications products as recited in claim 12 wherein the step of allowing a potential customer access to said telecommunications service simulation equipment occurs in response to a sales agent command.

14. A method of demonstrating telecommunications products as recited in claim 13 wherein the step of demonstrating occurs while said sales agent is in telephone communication with said potential customer.

15. A method for demonstrating telecommunications products comprising:
    establishing a telephone communications link across a public switched telecommunications network between a sales agent and a potential customer;
    selectively controlling, by the sales agent, a plurality of telecommunications service simulation equipment; and
    selectively demonstrating at least one telecommunications service to said potential customer.

16. A method as recited in claim 15 wherein the step of selectively controlling further comprises the steps of:
    controlling a matrix switch to connect said potential customer to an interactive services simulator;
    controlling said interactive services simulator to generate a telecommunications service; and
    demonstrating said telecommunications service to said potential customer.

17. A method as recited in claim 15 wherein the step of selectively controlling further comprises the steps of:
    controlling a matrix switch to connect said potential customer to a circuit simulator;
    controlling said circuit simulator to generate a simulated long distance service; and
    demonstrating the quality of said simulated long distance service to said potential customer.

18. A method as recited in claim 15 wherein the demonstrated telecommunications service comprises at least one of voice mail, privacy manager, long distance calling, internet service, or call waiting.

19. A method as recited in claim 15 wherein the demonstrated telecommunications service comprises a circuit-switched service or a packet-switched service.

20. A method as recited in claim 15, further comprising providing an internet connection to said telecommunications service simulation equipment.

* * * * *